(12) United States Patent
Koutsky et al.

(10) Patent No.: US 7,256,686 B2
(45) Date of Patent: Aug. 14, 2007

(54) VEHICLE SEAT WITH VIBRATION MONITORING ABILITY

(75) Inventors: L. John Koutsky, Milan, IL (US); Cole T. Brodersen, Davenport, IA (US); William Tuman, Colona, IL (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 10/445,729

(22) Filed: May 27, 2003

(65) Prior Publication Data

US 2004/0239491 A1    Dec. 2, 2004

(51) Int. Cl.
*B60Q 1/00*    (2006.01)
(52) U.S. Cl. ............... 340/438; 340/573.1; 340/573.7; 340/576; 340/665; 340/667; 73/379.01; 600/552
(58) Field of Classification Search ........... 340/438, 340/457, 440, 575, 576, 573.7, 689, 425.5, 340/5.53, 573.1, 667, 665, 666, 668, 457.1, 340/439; 180/271; 600/595, 534, 547; 73/379.01, 73/172
See application file for complete search history.

(56) References Cited

U.S. PATENT DOCUMENTS

| | | | | |
|---|---|---|---|---|
| 5,595,023 A | * | 1/1997 | Weder | 47/72 |
| 5,826,578 A | * | 10/1998 | Curchod | 600/595 |
| 6,009,750 A | * | 1/2000 | Maurer et al. | 73/172 |
| 6,119,516 A | * | 9/2000 | Hock | 73/379.01 |
| 6,242,701 B1 | * | 6/2001 | Breed et al. | 177/144 |
| 6,271,760 B1 | * | 8/2001 | Watanabe et al. | 340/667 |
| 6,313,749 B1 | * | 11/2001 | Horne et al. | 340/575 |
| 6,433,690 B2 | * | 8/2002 | Petelenz et al. | 340/573.1 |
| 6,697,723 B2 | * | 2/2004 | Olsen et al. | 701/45 |
| 6,724,920 B1 | * | 4/2004 | Berenz et al. | 382/118 |
| 6,834,436 B2 | * | 12/2004 | Townsend et al. | 33/512 |

OTHER PUBLICATIONS

Int. Standard ISO 10326-1, 1992.
Int. Standard ISO 2631-1, 1997.
EU Directive PE-CONS 3616, Apr. 5, 2002.
Directive 2002/44/EC, Jul. 6, 2002.

* cited by examiner

*Primary Examiner*—Davetta W. Goins
(74) *Attorney, Agent, or Firm*—Niro, Scavone, Haller & Niro

(57) ABSTRACT

The present invention concerns a system for measuring the vibration an operator of a piece of the equipment encounters while operating the equipment. The system includes at least one motion measuring means, such as an accelerometer. The accelerometer may be affixed to the equipment or integrated into the equipment. In addition, motion data recording equipment that is in electrical communication with the accelerometer may also be provided. An alarm may be used to indicate that a preset limit has been or is about to be exceeded.

52 Claims, 2 Drawing Sheets

VEHICLE SEAT WITH VIBRATION MONITORING ABILITY

BACKGROUND OF THE INVENTION

The present invention relates to a system and method for measuring vibration. More specifically, the present invention concerns a vehicle seat which has built into the seat and other seat components such as armrests and control consoles accelerometers or transducers which are coupled to a processor for recording and processing data relating to the vibrations encountered by the occupant of the seat.

SUMMARY OF THE INVENTION

An increasing concern in the workplace is the amount of vibration an operator encounters while operating various pieces of moving equipment such as motorized vehicles and construction equipment such as, for example, a jackhammer and the like. Currently, standards exist in the European Union which state that an operator should not be exposed to conditions exceeding 1.15 m/s$^2$ for whole body vibration during an eight hour period. Monitoring and insuring that an operator's exposure does not exceed prescribed limits is the responsibility of the employer.

The problem, however, is that there are no known systems for monitoring whole body vibration in a working environment. The only system known by Applicants for measuring whole body vibration is a laboratory method set forth in ISO 10326-1:1992(E). The laboratory method involves taping discs to the outside of a vehicle seat. As recommended in ISO 10326-1, the discs have a raised center section so as to create a cavity in which to place the accelerometer.

This laboratory design, however, suffers from several drawbacks that make it impractical for use in actual working conditions. First, taping a disc to a piece equipment such as a vehicle seat is not practical. Through normal usage it would almost be inevitable that the disc would fall off of the equipment or be damaged during use by being exposed to the working environment. Moreover, in a vehicle seat application, the disc, with its raised section would be uncomfortable for an operator to sit upon, and this would no doubt lead to the accelerometers being routinely removed. In addition, the laboratory set-up does not provide a way to measure vibration at other locations such as at the arms of an operator.

Nor would having discs taped to the equipment present an aesthetically pleasing appearance. Once an accelerometer had either been removed, tampered with, fallen off, or simply have been damaged by virtue of being left exposed to the working environment, the ability to measure and record body vibration would be lost. Thus, there is a need for a system that can measure and record body vibration while taking into account the demanding needs of an actual working environment rather than a laboratory setting.

The present invention overcomes the above mentioned problems associated with the laboratory device by providing on a piece of moving equipment, such as a vehicle seat, at least one motion measuring device that may be located under the seat cover and/or backrest cover. In another embodiment, the motion measuring device may be housed within the cushions to measure the motion component experienced by the seat occupant. Locating the motion measuring device in a location beneath the outer surface of the equipment eliminates operator discomfort and provides a secure and safe environment for the accelerometer.

In another embodiment a motion measuring device may be located at other locations occupied by an operator. Such locations include, but are not limited to, armrests and control consoles.

The present invention may also include components for storing and/or processing the motion related data. The system may also be equipped with an alarm to warn an operator or employer that a prescribed limit is either approaching or has been exceeded. In addition, a personal, portable data storage device may be used which accompanies the operator to any piece of equipment that may be used during the course of the work day. Lastly, the system may be adapted to wirelessly transmit the motion the data to other locations and devices as well.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
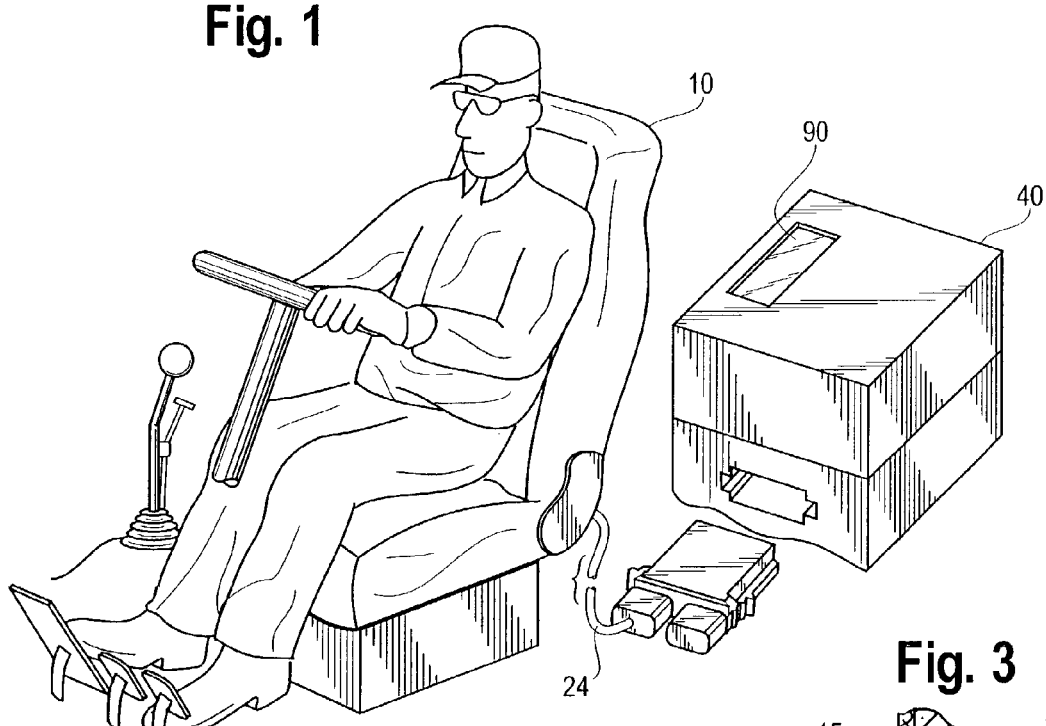
FIG. 1 is a perspective view of one embodiment of the present invention.
Figure 2:
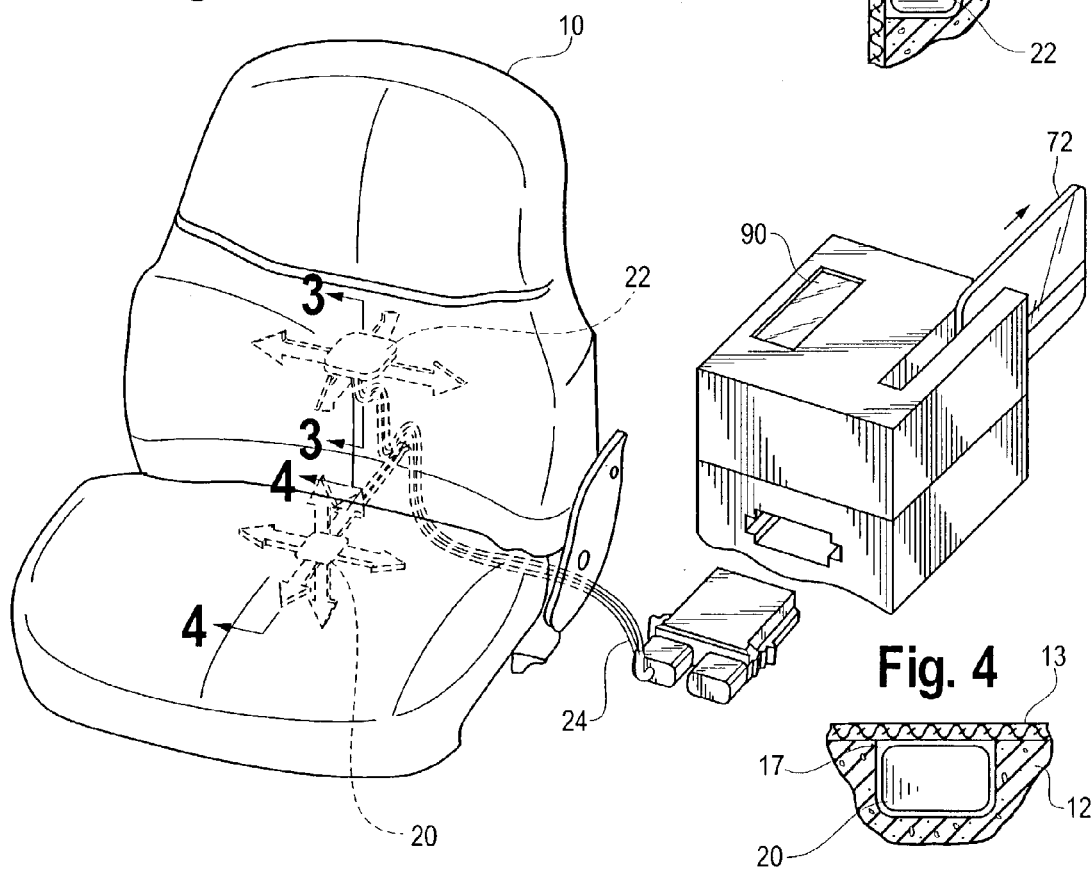
FIG. 2 is a perspective view illustrating how an embodiment of the present invention may be used with a vehicle seat.

As shown in FIGS. 1 and 2, in one embodiment, the present invention may be used with a seat 10, which includes motion measuring devices such as accelerometers 20 and 22. The motion measuring device may be designed to measure motion such a vibration and/or acceleration in various directions such as the x, y and z axes. While two accelerometers are shown in the preferred embodiment, with accelerometer 20 having the ability to measure acceleration or motion in the x, y, and z axes, and accelerometer 22 having the ability to measure acceleration or motion in the x and y axes other motion measuring devices and configurations may be used as well. For example, a single or multiple motion measuring devices may also be used. In addition, the motion measuring device may be used to measure motion in one direction or multiple directions.

Figure 3:
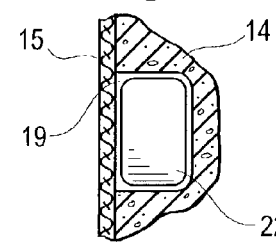
FIG. 3 is a cross-sectional view taken along line 3-3.
Figure 4:
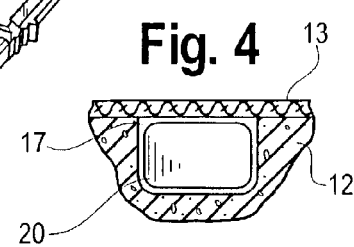
FIG. 4 is a cross-sectional view taken along line 4-4.
Figure 5:
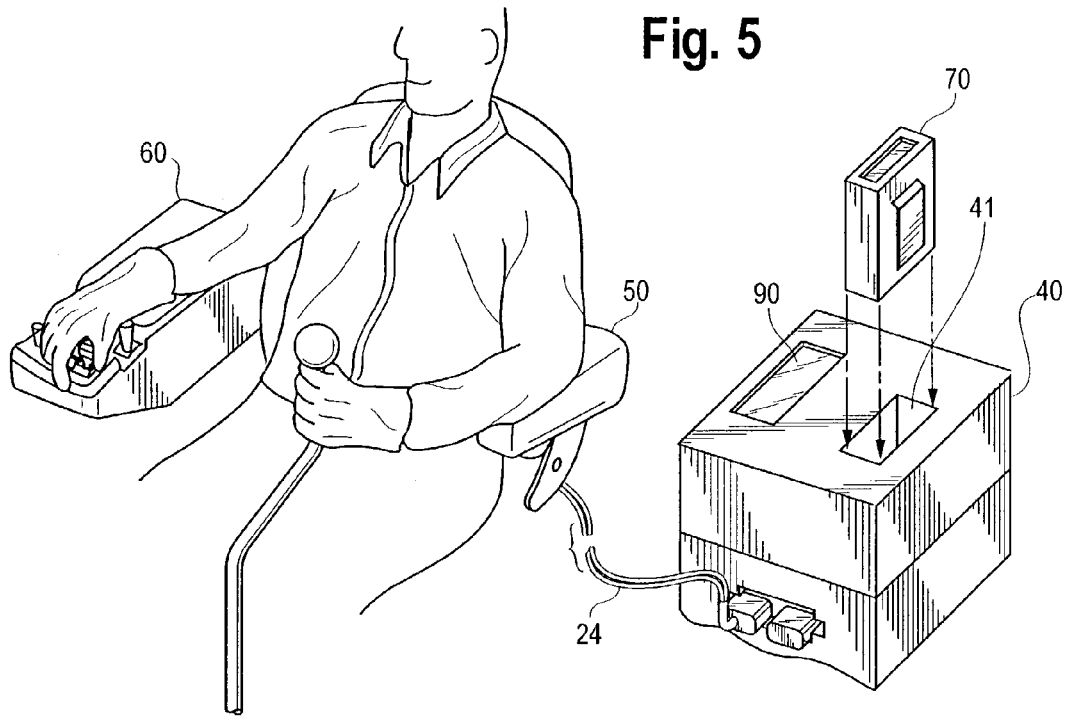
FIG. 5 is a perspective view of second embodiment of the present invention.
Figure 8:
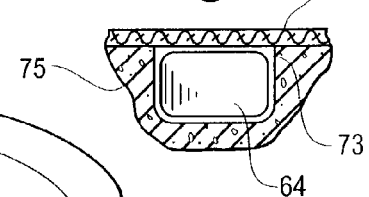
FIG. 8 is a cross-sectional view taken along line 8-8.

As shown in FIGS. 2-4, the preferred motion measuring device is an accelerometer 20 which may be located in seat cushion 12 of seat 10 and accelerometer 22 which may be located in backrest cushion 14. Both accelerometers are located under seat cover 13 and backrest cover 15. To accomplish this, the accelerometers and associated wiring 24 may be affixed to the backside of the covers prior to injecting foam into the seat mold. Once foam is injected into the mold, the accelerometers and wiring are securely held in place. Alternately, the accelerometers may be located in aperture 17 in seat cushion 12 and aperture 19 in backrest cushion 14 as well.

Of course, the securement of the accelerometers and wiring may be accomplished in other ways known to those of ordinary skill in the art as well. For example, in non-molding applications, the accelerometers may simply be located in a pre-formed aperture in a cushion prior to the attachment of the covers. Regardless of the method of manufacture selected, locating the motion measuring device below the outer surface of equipment, such as seat 10, will assist in maintaining the integrity of the apparatus.

Wiring 24 electronically connects the motion measuring device to a data processor which may be located in housing 40. The types of data processors that may be used with the present invention include, but are not limited to, a microprocessor, digital signal processor, application specific integrated circuit, random access memory, as well as other known processors known to those of skill in the art.

The processor is configured to convert the data received from the motion measuring device into a usable format, such as making the data recordable. In addition, housing 40 may also include an internal storage means for storing the data generated. The internal storage means may include, but is not limited to, hard drives such as those using random access memory and the like.

In addition, housing 40 may also include a dock 41 through which a portable data storage device 70 or 72 maybe coupled to the system. The portable data storage device may include, but is not limited to, a portable storage data unit 70 or a card 72. The portable storage device may also employ magnetic technology. This technology includes, but is not limited to, magnetic cards, tapes, floppy disks, hard disks, zip disks and the like. Optical storage technology may be used as well. This technology includes, but is not limited to, optical disks and the like. Other portable data storage devices that may be used include, as described above, a storage unit 70 that contains random access memory or a memory chip. Smart card technology may also be used to process and/or store the data received from the motion measuring device. Such technology includes, but is not limited to, integrated circuit microprocessor cards, integrated circuit memory cards, optical memory cards and the like.

Figure 6:
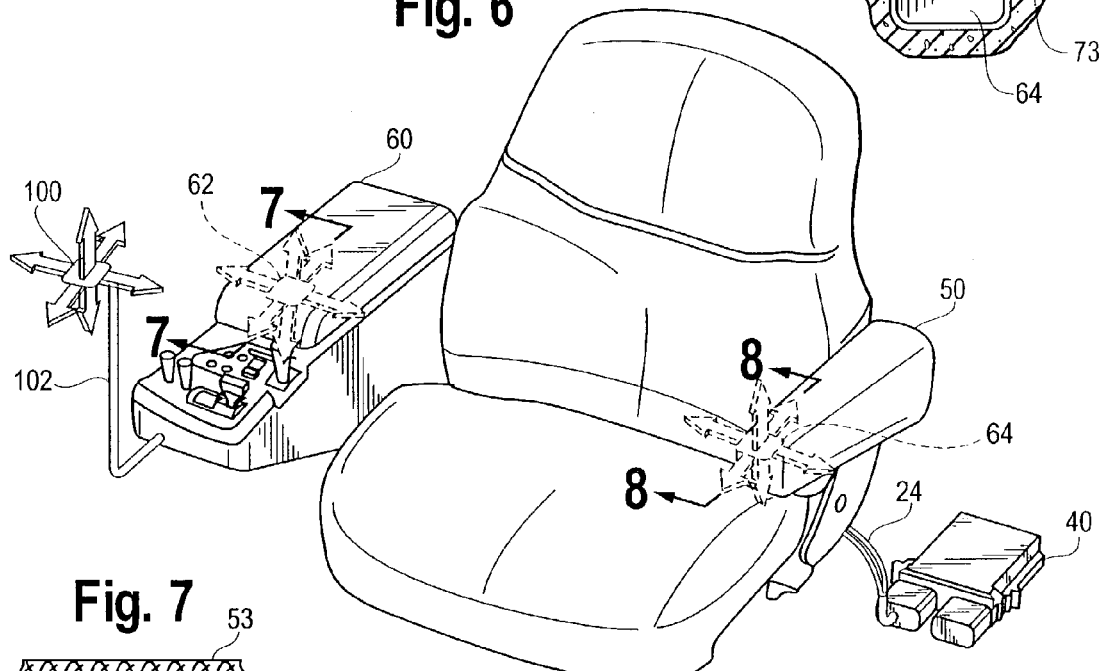
FIG. 6 is a perspective view illustrating how an embodiment of the present invention may be used with an armrest and control console.

As shown in FIGS. 5-8, the present invention may also include embodiments in which a motion measuring device is located in or integrally incorporated into either an armrest 50 or a control console 60 or both. In one alternate embodiment, as shown in FIG. 6, a motion measuring device such as an accelerometer 62 may be located in a control console 60. As with the accelerometers described above, the accelerometer may be used to measure motion in the x, y, and z axes. Locating an accelerometer in this position permits motion to be measured at a user's arm. As also shown in FIG. 6, an accelerometer 64 may also be located in armrest 50. As with the accelerometers described above, the accelerometer may be used to measure motion in the x, y, and z axes. Locating a motion measuring device in this position permits motion to be measured at a user's arm.

Figure 7:
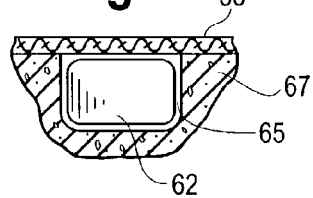
FIG. 7 is a cross-sectional view taken along line 7-7.

As with the embodiment shown in FIGS. 3 and 4, the motion measuring device is preferably located under the outer surface of the control counsel. This may be done by locating the measuring device under outer surface 53 as shown in FIG. 7. Alternately, motion measuring device 62 may be located in aperture 65 of a cushion 67.

Likewise, motion measuring device 64 should be located under the outer surface of the armrest. This may be done by locating the measuring device under cover 71. Alternately, motion measuring device 64 may be housed in aperture 73 of cushion 75.

FIG. 6 illustrates another embodiment of the present invention. This embodiment further includes a floating or movable motion measuring device 100. Measuring device 100 may be an accelerometer as described above. By the term floating, it is meant that motion measuring device 100 may be placed or positioned in a wide variety of desired locations. For example, motion measuring device 100 may attachable to user's wrist or forearm so as to measure the vibration at this point on the operator. Motion measuring device 100 maybe affixed in this application through the use of a wristband. Of course, other ways to fasten measuring device 100 include, but are not limited to, pins, clasps, Velcro, adhesive, and snaps as well as in other ways known to those of skill art. In addition, movable measuring device 100 may also be located at other points on the operator or at other locations on the equipment.

As is further illustrated in FIG. 6, movable measuring device 100 is connected to the system through flexible wiring 102. Alternately, a wireless connection may be used as well to link measuring device 100 to the remainder of the system. Using either a wireless connection or flexible hard wiring provides the versatility that allows measuring device 100 to be positionable in a wide variety of desired locations.

Using a portable data storage 70 or 72 device enhances the utility of the system. For example, multiple pieces of equipment may be provided with the necessary motion measuring devices and processors with all of the processors being designed to work the personal data storage device. Configuring the system in this manner allows an operator to take a portable data storage device, which is personal to the operator, from location to location and from one piece of equipment to another. Configuring the system in this manner maintains an employer's ability to monitor and record the total vibration encountered by the operator for a given work period no matter how many different pieces of equipment are used by an operator.

The system may also be designed to recognize a unique identification code associated with a particular operator. This allows the activation of the equipment to be conditioned upon the proper recognition of an authorized user. The system may also be configured to record the date and time a user operated a specific piece of equipment. This would allow employers to retain the vibration data and create a long term record for future use.

The data generated by the accelerometer may also be used to sound an alarm so as to warn the operator or employer when a maximum or prescribed limit is about to be reached or has been exceeded. The alarm may be visual in nature such as a warning on a display monitor or audio in nature. Readout 90 of the data may also be displayed to the operator or employer so that the vibrations encountered may be monitored. Lastly, the data may be transmitted wirelessly to a remote location for use and storage by an employer.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A system for measuring vibration encountered by an occupant of a vehicle comprising:
   a seat having an outer surface;
   a backrest having an outer surface;
   at least one accelerometer mounted in the seat and/or backrest for generating data indicative of acceleration encountered by an operator;
   a processor in communication with said accelerometer, said processor converting the generated data into cumulative whole body vibration data over a predetermined time period; and
   a random access memory for storing the cumulative whole body vibration data.

2. The system of claim 1 wherein said cumulative whole body vibration data is displayed.

3. The system of claim 1 wherein said processor permits operation of the vehicle upon recognition of an authorized operator through a unique identification code associated with said authorized operator.

4. The system of claim 1 wherein said random access memory is portable.

5. The system of claim 1 further comprising an alarm device which is activated in response to a signal indicating that a preset limit has been exceeded.

6. The system of claim 1 further comprising one or more armrests having mounted therein one or more accelerometers for generating data indicative of acceleration encountered by an operator.

7. The system of claim 1 further comprising a transmitter for receiving cumulative whole body vibration data from said processor and transmitting said data to a remote receiving station.

8. The system of claim 1 wherein said accelerometer measures acceleration in the direction of the x-axis.

9. The system of claim 1 wherein said accelerometer measures acceleration in the direction of the y-axis.

10. The system of claim 1 wherein said accelerometer measures acceleration in the direction of the z-axis.

11. The system of claim 1 wherein said accelerometer measures acceleration in the direction of the x and y axes.

12. The system of claim 1 wherein said accelerometer measures acceleration in the direction of the x, y and z axes.

13. The system of claim 4 wherein the random access memory is located in a magnetic card.

14. The system of claim 4 and said random access memory is located in an optically read card.

15. The system of claim 4 wherein said random access memory is located in a disk.

16. The system of claim 4 wherein said processor and random access memory are located in an integrated circuit microprocessor card.

17. The system of claim 4 wherein said random access memory is located in an integrated circuit memory card.

18. The system of claim 4 wherein said random access memory is located in an optically read memory card.

19. A system for measuring cumulative whole body vibration encountered by an operator of moving equipment comprising:
   at least one accelerometer capable of generating data indicative of cumulative whole body vibration encountered by an operator of said moving equipment over a predetermined time period;
   a processor in communication with said accelerometer, said processor converting the generated data into recordable data; and
   a random access memory for storing cumulative whole body vibration data.

20. The system of claim 19 further including additional accelerometers and processors in association with additional pieces of equipment, and a portable memory that is personal to an operator and operable with said additional processors on said additional equipment.

21. The system of claim 19 wherein said data indicative of cumulative whole body vibration encountered by the operator is displayed.

22. The system of claim 19 wherein said processor permits operation of the equipment upon recognition of an authorized operator through a unique identification code associated with said authorized operator.

23. The system of claim 19 further comprising an alarm device which is activated in response to a signal indicating that a preset limit has been exceeded.

24. The system of claim 19 further comprising a vehicle seat having mounted therein the accelerometer for generating data indicative of cumulative whole body vibration experienced by an operator.

25. The system of claim 19 further comprising a transmitter for receiving motion data from said accelerometer and transmitting said data to a remote receiving station.

26. The system of claim 19 wherein said accelerometer measures acceleration in the direction of the x-axis.

27. The system of claim 19 wherein said accelerometer measures acceleration in the direction of the y-axis.

28. The system of claim 19 wherein said accelerometer measures acceleration in the direction of the z-axis.

29. The system of claim 19 wherein said accelerometer measures acceleration in the direction of the x and y axes.

30. The system of claim 19 wherein said accelerometer measures acceleration in the direction of the x, y and z axes.

31. The system of claim 19 wherein said random access memory is located in a magnetic card.

32. The system of claim 19 and said random access memory is located in an optically read card.

33. The system claim 19 wherein said random access memory is located in least one memory chip.

34. The system of claim 19 wherein said random access memory is located in a disk.

35. The system of claim 19 wherein said processor and said random access memory are located in an integrated circuit microprocessor card.

36. The system of claim 19 wherein said random access memory is located in an integrated circuit memory card.

37. The system of claim 19 wherein said random access memory is located in an optically read memory card.

38. The system of claim 1 further comprising one or more control consoles having mounted therein an accelerometer for generating data indicative of acceleration encountered by an operator.

39. The system of claim 19 further comprising one or more control consoles having mounted therein an accelerometer for generating data indicative of cumulative whole body vibration experienced by an operator.

40. The system of claim 19 further comprising one or more armrests having mounted therein an accelerometer for generating data indicative of cumulative whole body vibration experienced by an operator.

41. The system of claim 1 wherein the position of said accelerometer is adjustable.

42. The system of claim 19 wherein the position of said accelerometer is adjustable.

43. The system of claim 1 further including a positionable accelerometer for generating data indicative of acceleration encountered by and operator.

44. The system of claim 19 further including a positionable accelerometer for generating data indicative of cumulative whole body vibration experienced by and operator.

45. A system for measuring cumulative whole body vibration encountered by an occupant of a vehicle comprising:
- a seat having an outer surface;
- a backrest having an outer surface;
- a first accelerometer mounted in said seat below said outer surface for generating first data indicative of x, y and z acceleration encountered by said seat;
- a second accelerometer mounted in said backrest below said outer surface for generating second data indicative of x and y acceleration encountered by said backrest;
- a processor in communication with said accelerometers said processor converting the first and second generated data into recordable cumulative whole body vibration related data; and
- a memory for storing the vibration related data;
- wherein cumulative whole body vibration data is recorded in said memory for
- said particular operator.

46. The system of claim 45 further comprising a display communicating with said processor, said display displaying vibration related data.

47. The system of claim 45 wherein said processor communicates with a card reader, said card reader adapted to read a unique identification code from a card, said identification code identifying a particular operator.

48. A system for recording whole body vibration data for a particular operator over a plurality of vehicles comprising:
- a plurality of vehicles, each equipped with at least one accelerometer in a vehicle component that makes physical contact with an operator when the operator operates the vehicle;
- at least one processor module attachable to each of said accelerometers, wherein said processor converts acceleration data into whole body vibration data;
- an operator identification means allowing identification of said particular operator when said particular operator operates any one of the plurality of vehicles;
- a recorder in communication with the processor that stores data relating to total body vibrations received by said particular operator as said particular operator operates different vehicles from the plurality of vehicles.

49. The system of claim 48 wherein said vehicle component is an armrest.

50. The system of claim 48 wherein said vehicle component is a seat.

51. The system of claim 48 wherein said vehicle component is a backrest.

52. The system of claim 1 wherein said cumulative whole body vibration data are transmitted wirelessly to a remote site.

* * * * *

UNITED STATES PATENT AND TRADEMARK OFFICE
CERTIFICATE OF CORRECTION

| | | |
|---|---|---|
| PATENT NO. | : 7,256,686 B2 | Page 1 of 1 |
| APPLICATION NO. | : 10/445729 | |
| DATED | : August 14, 2007 | |
| INVENTOR(S) | : L. John Koutsky | |

It is certified that error appears in the above-identified patent and that said Letters Patent is hereby corrected as shown below:

Title Page, Item (75), the correct inventorship for this patent is:

L. John Koutsky
Cole T. Brodersen
William Tuman
Qiwei He

Signed and Sealed this

Twentieth Day of November, 2007

JON W. DUDAS
*Director of the United States Patent and Trademark Office*